Feb. 15, 1966  W. C. EDDY, JR  3,235,873
AERIAL SURVEY SYSTEM
Filed Aug. 24, 1962

INVENTOR.
WILLIAM C. EDDY JR.
BY
ATTORNEYS

3,235,873
AERIAL SURVEY SYSTEM
William C. Eddy, Jr., Michigan City, Ind., assignor to Television Associates of Indiana, Inc., Michigan City, Ind., a corporation of Indiana
Filed Aug. 24, 1962, Ser. No. 219,250
3 Claims. (Cl. 346—8)

The present invention relates to aerial survey systems, and more particularly to an aerial survey system for determining the profile of terrain.

Modern communication and transportation systems demand an accurate survey of the terrain which they pass over for the determination of the positions and heights of obstacles. For example, microwave transmission systems require that no obstacles or interfering reflective surfaces be present between the transmission towers. The clearance of obstacles is a function of the height of the towers, but this height can only be determined after an accurate survey finds the height of all potential obstacles, such as trees, buildings, and hills.

Many survey systems have been devised to obtain profiles with the accuracy desired. Ground surveys, although extremely accurate, involve much time and expense, and, in jungle and other wild areas, danger to survey crews. To avoid these problems, useful air survey systems have been devised, allowing high speed, reasonable accuracy and no exceptional danger. The air survey systems have the additional advantages that extremely rugged terrain can be mapped easily and that property owners along the proposed right of way of new highway, pipeline, or transmission systems are not alerted to increase the price of their land.

However, obstacles in the proposed paths can take the form of growing and/or easily removed objects, such as trees and other plants, and inanimate objects, such as hills, mountains, and cities. Past air survey systems necessarily relied on the pilots' descriptions of the terrain mapped and perhaps one or two photographs taken at the ends of the mapping runs. Therefore, one principal object of the present invention is to provide an aerial survey system which produces both a graphic profile of the land being surveyed, and a continuous set of photographs of the same land, thus permitting a ready identification of all obstacles.

An additonal object of the invention is to provide a survey system which will minimize the necessity of human control of the survey equipment during the flights of the airplane, giving the survey crew time to attend to such tasks as piloting.

Still another object of the invention is to provide a photograph and profile producing air survey system which automatically correlates each photograph with the portion of the profile corresponding to it.

Occasionally a crew operating a conventional air survey system fails to adequately identify the terrain surveyed, so that the terrain can be matched with the profile later only with difficulty. Therefore, a further object of the present invention is to provide an air survey system which will automatically identify the ground being surveyed.

Yet another object of the invention is to provide an aerial survey system of the type described which is easily manufactured of readily obtained components and which requires a relative minimum of servicing and repair.

Additional objects and advantages of the present invention will become apparent from the following description and accompanying drawings, wherein.

Figure 1:
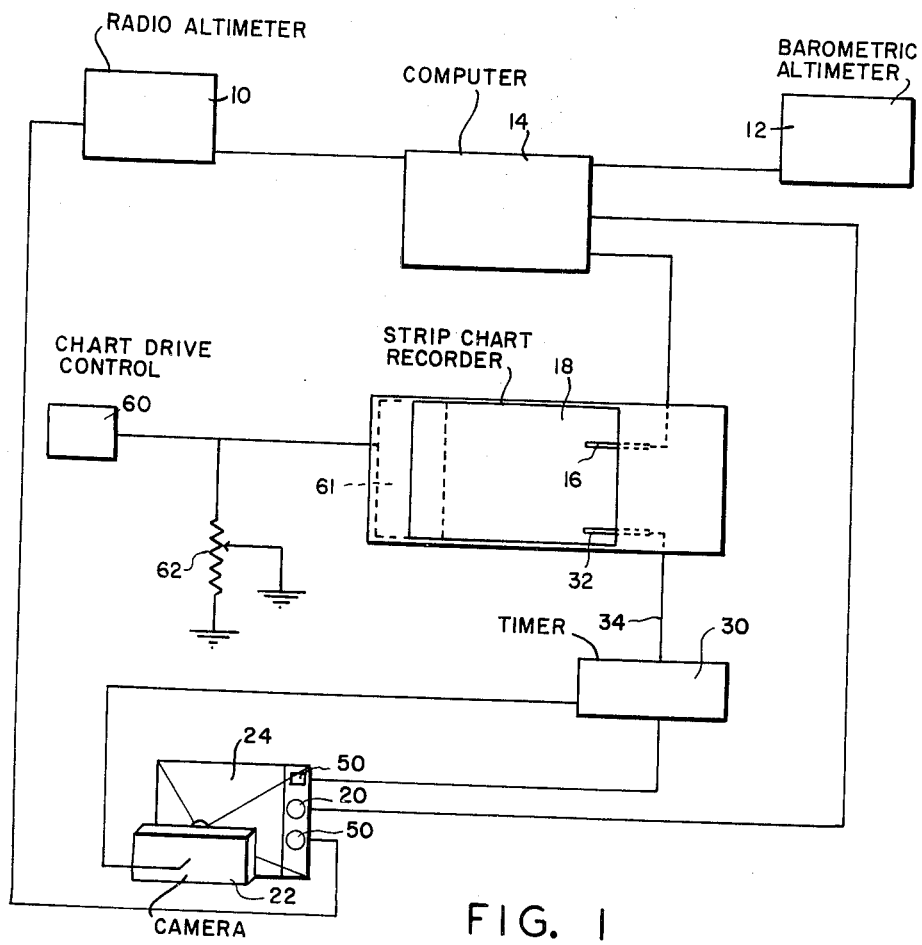
FIGURE 1 is a block diagrammatic view of the present invention.

Referring more specifically to the figures, and to FIGURE 1 in particular, a radio altimeter 10, recalibrated to provide a linear D.C. voltage changing proportionally to the altitude, and an electrical output barometeric or pressure altimeter 12, similarly calibrated, having their outputs connected to a computer 14, all components being mounted in an airplane (not shown). In the computer the two signals are added in a conventional manner to produce a voltage proportional to the absolute terrain changes beneath the airplane. Since the radio atltimeter utilizes a radar beam with a tangible lateral ground illumination, the signal produced by altimeter 10 is an integration of the ground illuminated, producing the mean altitude of the area illuminated at any given instant. Using this means does not materially affect the use of the present invention, since any objects large enough to affect the usefulness of the profile, and still within a normal radius of the point on the flight path being covered, are prominent enough to be readily seen on photographs produced as described hereinafter.

Figure 2:
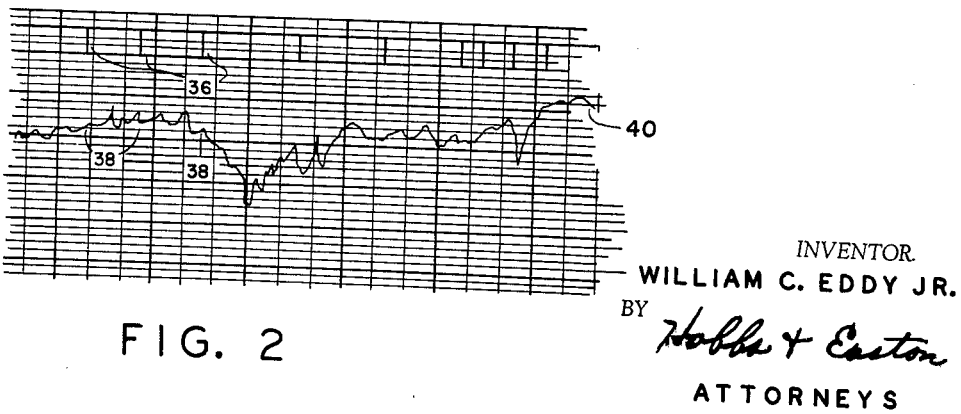
FIGURE 2 is a reproduction of a graphic profile produced by the invention.

The output of computer 14 is applied to one pen 16 of a conventional strip chart recorder 18, and to a radio altimeter 20. The recorder is of the type which varies the lateral position of a pen or needle to correspond with the signal strength at its input while a chart drive moves the chart longitudinally at a relatively constant rate. The resultant chart, as seen in FIGURE 2, is a representation of the ground underneath the airplane correlated with a camera 22 photographing the terrain directly beneath the aircraft through a port 24 in the bottom of the airplane.

A timer 30 of the type which produces a voltage impulse at regular intervals is provided to operate camera 22 by conventional means, and the timer sends a signal to a pen 32 of recorder 18 through line 34 to record the time of camera operation on the chart. Pen 32 is placed laterally of pen 16, and thus spikes 36 produced at the times camera 22 is fired indicate the portions 38 of the profile 40 corresponding to the photographs of the camera. The photographs are thereby keyed to the profile, allowing ready detailed visual analysis of the nature of any obstacle noted on the profile.

To make clear to which of spikes 36 and given picture from camera 22 corresponds, a counter 50 operated by timer 30 is placed in the field of view of camera 22. As each photograph is taken, counter 50 is actuated by timer 30 to advance one additional step, thus giving each photograph its own number. Furthermore, altimeter 20 is also placed in the field of view of the camera, thus suplying the exact computed altitude of the land beneath the airplane at the time a picture is taken and allowing a person with the photograph and the profile to determine the computed altitude of terrain shown in the photograph. Finally, an altimeter 54 operated by radio altimeter 10 is also placed in the field of the camera, thus giving an indication of the variations of the airplane in altitude above the ground. This last altimeter allows the real size of objects in the photograph to be found from information about the camera and information on the photograph alone.

Variations in atmospheric conditions, such as tail and head winds, may vary the ground speed of the airplane being used for the aerial survey with the present invention. When a constant speed chart drive is used in recorder 18, such variations in ground speed will appear as variations in the length of graph corresponding to a given length of ground covered. Such variations do not materially affect the use of the present invention in some operations, such as determining paths and tower heights for microwave relay systems. However, when the length of the path is needed with great accuracy, as for building a highway, these variations become important. Since the photographs produced by the invention have some overlap, the variations can be determined from the photographs. However, this determination is tedious, and an automatic correction is desirable. The correction of such variations is provided in the invention by a chart drive control 60 producing a voltage, proportional to the ground speed of the airplane, which is fed to the chart drive motor 61. In this case, the chart drive motor rate is dependent on the voltage entering it. Thus, as the airplane speed increases, the voltage increases, driving motor 61 more quickly and retaining a fixed proportion of chart length to length of ground path.

Control 60 may determine the voltage to drive motor 61 from information due to Doppler radar, in a conventional manner. It may also use a flicker meter method, in which a photocell is placed at a narrow lateral slot in the bottom of the airplane at each end of the airplane and the voltage derived from the time delay as patches of vegetation, water and concrete roads produce variations in the amount of light reaching each of the photocells, with the photocell in the forward part of the airplane reacting before the other to each new stimulus. A rehostat control 62 for the chart drive motor may be included in the circuit, with one end grounded to drain current from the motor. This control is used to adjust the initial drive rate for some desired proportion of drive rate to ground speed.

In using the present invention, barometric altimeter 12 is adjusted with a pressure reference selected as that at 1500 feet above the ground terrain, for example, with the aircraft flying approximately 900 feet below this reference. The signals from the two altimeters 10 and 12 are combined in computer 14 and fed to pen 16. At the same time, timer 30 is started, and camera 22 photographs at regular intervals while pen 32 records the signal from the timer.

The pilot, starting at a chosen spot, flies the aircraft over the desired path while the invention records the path. After completing the path, the pilot may turn around and repeat the profile as a check, or he may proceed to the next stage of the survey. If any portion of a path appears undesirable, having undesirable features, the pilot may immediately return to the start of the run and try a new path. Operating in this manner, he may complete several hundred miles of the survey in a single day.

At the end of each day, the air survey crew can develop the film from camera 22 and, using the profile and photographs, prepare a preliminary report. Since every obstacle is photographed with reference to the profile to show its height, the information gained in the single day of operation is sufficient to start land buying and preparation of material to erect the microwave towers, build the highway, or start any other operation. The precise position of all necessary sites and routes can be located on the photographs, thus speeding the process of land acquisition and keeping the interest of the particular company or agency secret to prevent inflation of land values.

In the claims, the term recorder "pens" refers to pens, needles, or any other device for making a mark upon a chart paper. Although only one form of the invention has been described herein, various changes and modifications may be made without departing from the scope of the invention.

I claim:

1. An aerial survey system in an airplane, comprising a radio altimeter for determining the altitude of said airplane above ground level and producing a voltage proportional to said altitude, a barometric altimeter for determining an absolute altitude of said airplane and producing a voltage proportional to said absolute altitude, a computer, said first and second mentioned altimeters having their outputs connected to inputs of said computer, a strip chart recorder having a plurality of pens and a drive motor, the rate of operation of said drive motor being proportional to its input voltage, the output of said computer being connected to one of said plurality pens, a timer, said timer being connected to another of said plurality of pens, a camera for taking pictures of the terrain being surveyed, said timer being connected to operate said camera, a gauge placed in the field of view of said camera and connected to the output of said radio altimeter, a gauge placed in the field of view of said camera and connected to the output of said computer, a counter placed in the field of view of said camera and connected to said timer, and means connected to said drive motor for producing a voltage proportional to the ground speed of said airplane.

2. An aerial survey system for use in aircraft, comprising a radio altimeter for determining the altitude of said aircraft above ground level and producing a voltage proportional to said altitude, a barometric altimeter for determining an absoulte altitude of said craft and producing a voltage proportional to said absolute altitude, a strip chart recorder having a plurality of pens and a drive motor, the rate of operation of said drive motor being proportional to its input voltage, said first and second mentioned altimeters having their outputs connected to one of said plurality of pens, a timer, said timer being connected to another of said plurality of pens, a camera for taking pictures of the terrain being surveyed, said timer being connected to operate said camera, a gauge placed in the field of view of said camera and connected to the output of said radio altimeter, a gauge placed in the field of view of said camera and connected to said first mentioned pen, a counter placed in the field of view of said camera and connected to said timer, and means connected to asid drive motor for producing a voltage proportional to the ground speed of said craft.

3. An aerial survey system for use in aircraft, comprising a radio altimeter for determining the altitude of said craft above ground level and producing a voltage proportional to said altitude, a barometric altimeter for determining an absolute altitude of said craft and producing a voltage proportional to said absolute altitude, a strip chart recorder having a plurality of pens, and first and second mentioned altimeters having their outputs connected to one of said plurality of pens, a timer, said timer being connected to another of said plurality of pens, a camera for taking pictures of the terrain being surveyed, said timer being connected to operate said camera, a gauge placed in the field of view of said camera and connected to the output of said radio altimeter, a gauge placed in the field of view of said camera and connected to said first mentioned pen, and a counter placed in the field of view of said camera and connected to said timer.

References Cited by the Examiner

UNITED STATES PATENTS

| | | | |
|---|---|---|---|
| 2,610,226 | 9/1952 | Klaasse et al. | 346—8 X |
| 2,611,802 | 9/1952 | Jensen. | |
| 3,001,187 | 9/1952 | Hammond et al. | 343—5 |

LEO SMILOW, *Primary Examiner.*

LEYLAND M. MARTIN, *Examiner.*